United States Patent
Inagaki et al.

(10) Patent No.: US 11,378,936 B2
(45) Date of Patent: Jul. 5, 2022

(54) CONTROL DEVICE, MECHANICAL SYSTEM, AND TIME SYNCHRONIZATION METHOD

(71) Applicant: FANUC CORPORATION, Yamanashi (JP)

(72) Inventors: Satoshi Inagaki, Yamanashi (JP); Hajime Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/849,168

(22) Filed: Apr. 15, 2020

(65) Prior Publication Data

US 2020/0379441 A1 Dec. 3, 2020

(30) Foreign Application Priority Data

May 27, 2019 (JP) .............................. JP2019-098455

(51) Int. Cl.
*G05B 19/4155* (2006.01)
*H04B 7/26* (2006.01)

(52) U.S. Cl.
CPC ....... *G05B 19/4155* (2013.01); *H04B 7/2678* (2013.01); *G05B 2219/41298* (2013.01)

(58) Field of Classification Search
None
See application file for complete search history.

(56) References Cited

U.S. PATENT DOCUMENTS 9,321,178 B2 * 4/2016 Cho .................. B25J 9/1679
2019/0383701 A1 * 12/2019 Tezuka ............... G05B 19/406

FOREIGN PATENT DOCUMENTS

JP 2015-163416 9/2015
JP 2018-130800 8/2018

* cited by examiner

*Primary Examiner* — Ryan A Jarrett
(74) *Attorney, Agent, or Firm* — Wenderoth, Lind & Ponack, L.L.P.

(57) ABSTRACT

A control device controls a mechanical device having a movable member driven by a motor. The control device includes a radio signal exchange unit that receives a sensor signal indicating a position, a velocity or an acceleration of a tip part of the movable member, a data acquisition unit that acquires first time-series data of acceleration based on the received sensor signal, a data calculation unit that calculates second time-series data of acceleration at the tip part based on a drive command to the motor, a delay time calculation unit that calculates, when the mechanical device performs a predetermined basic operation, a delay time of the first time-series data to the second time-series data, based on a degree of correlation between the first and second time-series data, and a time synchronization unit that synchronizes time of the sensor part and control device based on the delay time.

7 Claims, 7 Drawing Sheets

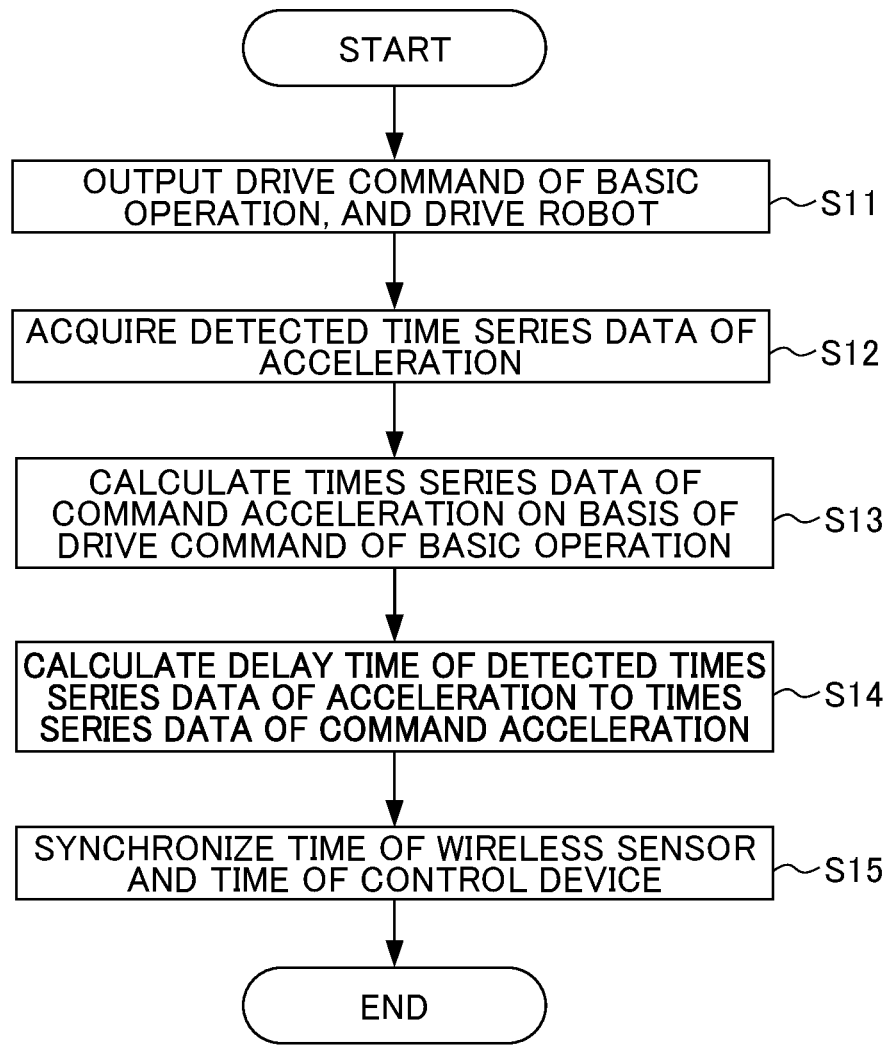

CONTROL DEVICE, MECHANICAL SYSTEM, AND TIME SYNCHRONIZATION METHOD

This application is based on and claims the benefit of priority from Japanese Patent Application No. 2019-098455, filed on 27 May 2019, the content of which is incorporated herein by reference.

BACKGROUND OF THE INVENTION

Field of the Invention

The present invention relates to a control device, a mechanical system, and a time synchronization method.

Related Art

High speed operation of a robot enables to shorten the cycle time thereof, resulting in leading to efficient production. However, as the velocity of the operation of the robot is increased, the tip part of the robot vibrates due to some factors such as insufficient rigidity of a reducer or a robot arm.

The technique to cope with such a problem has been proposed, in which the acceleration sensor attached to the tip part of the robot detects the vibration during when the robot operates, and learning control is performed so as to reduce the vibration. For example, Patent Document 1 shall be referred to.

In some cases, an acceleration sensor (hereinafter, also referred to as a wireless sensor) configured to wirelessly transmit a measured acceleration to a control device is used because of the complexity of wiring of the cable connecting the acceleration sensor and the control device for controlling the robot. It is noted that the vibration of the robot is calculated on the basis of the comparison between the command acceleration output by the control device and the acceleration detected by the wireless sensor. This requires that the time of the control device and the time of the wireless sensor are synchronized with each other. If the time of the control device and the time of the wireless sensor are not synchronized, incorrect vibration is calculated. Therefore, the vibration is not able to be suppressed correctly in some cases, whereby larger vibration is generated.

In this case, there are, for example, following two possible methods of: method (A) of directly connecting the control device and the wireless sensor by a cable or the like, for synchronization; and method (B) of transmitting a signal indicating current time from the control device (or the wireless sensor) to the wireless sensor (or the control device), for synchronization.

The method (A) requires periodical connection for synchronization because the time of the control device and the time of the wireless sensor deviate from each other as time elapses. However, the robot and the control device are arranged apart from each other in many cases, and thus it takes time and labor to directly connect the control device and the wireless sensor with a cable or the like. In the case where vibration is to be measured by use of a wireless sensor, the position and direction of the attached wireless sensor are required to be set, and thus it further takes time and labor to perform the above-described setting every time the wireless sensor is detached from the robot.

On the other hand, in the method (B), random delay may be generated between the control device and the wireless sensor, in some cases. Therefore, even when the control device (or the wireless sensor) transmits a signal of the current time to the wireless sensor (or the control device) at a time t1, a reception time t2 of the receiving side may be deviated due to such random delay.

The technique to cope with such a problem has been proposed, in which a reference correlation value is set on the basis of the command acceleration of the tip part of the arm thereof, to synchronize the time series data of command acceleration and the detected time series data of acceleration. For example, Patent Document 2 shall be referred to.

Patent Document 1: Japanese Unexamined Patent Application, Publication No. 2018-130800
Patent Document 2: Japanese Unexamined Patent Application, Publication No. 2015-163416

SUMMARY OF THE INVENTION

FIG. 1A shows one example of time series data of command acceleration of the operating velocity at which problematic vibration is generated. FIG. 1B shows one example of the time series data of acceleration detected by a wireless sensor of the operating velocity at which problematic vibration is generated.

As shown in FIG. 1A and FIG. 1B, since the waveform of the time series data of command acceleration and the waveform of the detected time series data of acceleration greatly deviate from each other are greatly different from each other in the operation deriving such actual problematic vibration, correct synchronization may not be performed.

Therefore, the time of the control device and the time of the wireless sensor shall be easily synchronized when the vibration is to be suppressed by learning control.

(1) A control device in one aspect of the present disclosure is configured to control a mechanical device having a movable member to be driven by a motor. The control device includes a radio signal exchange unit configured to receive a sensor signal indicating a position, a velocity or an acceleration of a tip part of the movable member of the mechanical device periodically detected by a sensor part arranged to the tip part, a data acquisition unit configured to acquire first time-series data of acceleration at the tip part of the movable member on the basis of the position, the velocity or the acceleration in the received sensor signal, a data calculation unit configured to calculate second time-series data of acceleration at the tip part of the movable member corresponding to the first time-series data, on the basis of a drive command to the motor, a delay time calculation unit configured to calculate, when the mechanical device is made to perform predetermined basic operation, a delay time of the first time-series data acquired by the data acquisition unit to the second time-series data calculated by the data calculation unit, on the basis of a degree of correlation between the first time-series data and the second time-series data, and a time synchronization unit configured to synchronize time of the sensor part and time of the control device, on the basis of the delay time calculated by the delay time calculation unit.

(2) A control device in one aspect of the present disclosure is configured to control a mechanical device having a movable member to be driven by a motor. The control device includes a radio signal exchange unit configured to receive a sensor signal indicating a position, a velocity or an acceleration of a tip part of the movable member of the mechanical device periodically detected by a sensor part arranged to the tip part, a data acquisition unit configured to acquire first time-series data of acceleration at the tip part of the movable member on the basis of the position, the velocity or the acceleration in the received sensor signal, a data calculation unit configured to calculate second time-series data of acceleration at the tip part of the movable member corresponding to the first time-series data, on the basis of a drive command to the motor, a delay time calculation unit configured to calculate, when the mechanical device is made to perform operation indicated in a program to be executed by the control device at a velocity equal to or less than a predetermined value instead of a velocity indicated in the program, a delay time of the first time-series data acquired by the data acquisition unit to the second time-series data calculated by the data calculation unit, on the basis of a degree of correlation between the first time-series data and the second time-series data, and a time synchronization unit configured to synchronize time of the sensor part and time of the control device on the basis of the delay time calculated by the delay time calculation unit.

(3) A mechanical system in one aspect of the present disclosure includes a mechanical device having a movable member to be driven by a motor, and the control device according to (1) or (2).

(4) A time synchronization method in one aspect of the present disclosure is executed to perform, in a mechanical system including a mechanical device having a movable member to be driven by a motor and a control device for controlling the mechanical device, time synchronization between a sensor part arranged to a tip part of the movable member of the mechanical device and the control device. The time synchronization method includes a radio signal exchanging step of receiving a sensor signal indicating a position, a velocity or an acceleration of the tip part periodically detected by the sensor part, a data acquiring step of acquiring first time-series data of acceleration at the tip part of the movable member, on the basis of the position, the velocity or the acceleration in the received sensor signal, a data calculating step of calculating second time-series data of acceleration at the tip part of the movable member corresponding to the first time-series data, on the basis of a drive command to the motor, a delay time calculating step of calculating, when the mechanical device is made to perform predetermined basic operation, a delay time of the first time-series data acquired in the data acquiring step to the second time-series data calculated in the data calculating step, on the basis of a degree of correlation between the first time-series data and the second time-series data, and a time synchronizing step of synchronizing time of the sensor part and time of the control device on the basis of the delay time calculated in the delay time calculating step.

(5) A time synchronization method in one aspect of the present disclosure is executed to perform, in a mechanical system including a mechanical device having a movable member to be driven by a motor and a control device for controlling the mechanical device, time synchronization between a sensor part arranged to a tip part of the movable member of the mechanical device and the control device. The time synchronization method includes a radio signal exchanging step of receiving a sensor signal indicating a position, a velocity or an acceleration of the tip part periodically detected by the sensor part, a data acquiring step of acquiring first time-series data of acceleration at the tip part of the movable member, on the basis of the position, the velocity or the acceleration in the received sensor signal, a data calculating step of calculating second time-series data of acceleration at the tip part of the movable member corresponding to the first time-series data, on the basis of a drive command to the motor, a delay time calculating step of calculating, when the mechanical device is made to perform operation indicated in a program to be executed by the control device at a velocity equal to or less than a predetermined value instead of a velocity indicated in the program, a delay time of the first time-series data acquired in the data acquiring step to the second time-series data calculated in the data calculating step, on the basis of a degree of correlation between the first time-series data and the second time-series data, and a time synchronizing step of synchronizing time of the sensor part and time of the control device, on the basis of the delay time calculated in the delay time calculating step.

In one aspect of the present disclosure, the time of the control device and the time of the wireless sensor are able to be easily synchronized when vibration is to be suppressed by learning control.

BRIEF DESCRIPTION OF THE DRAWINGS

FIG. 8 is a flowchart for describing time synchronization processing of a control device.

DETAILED DESCRIPTION OF THE INVENTION

Figure 1A:
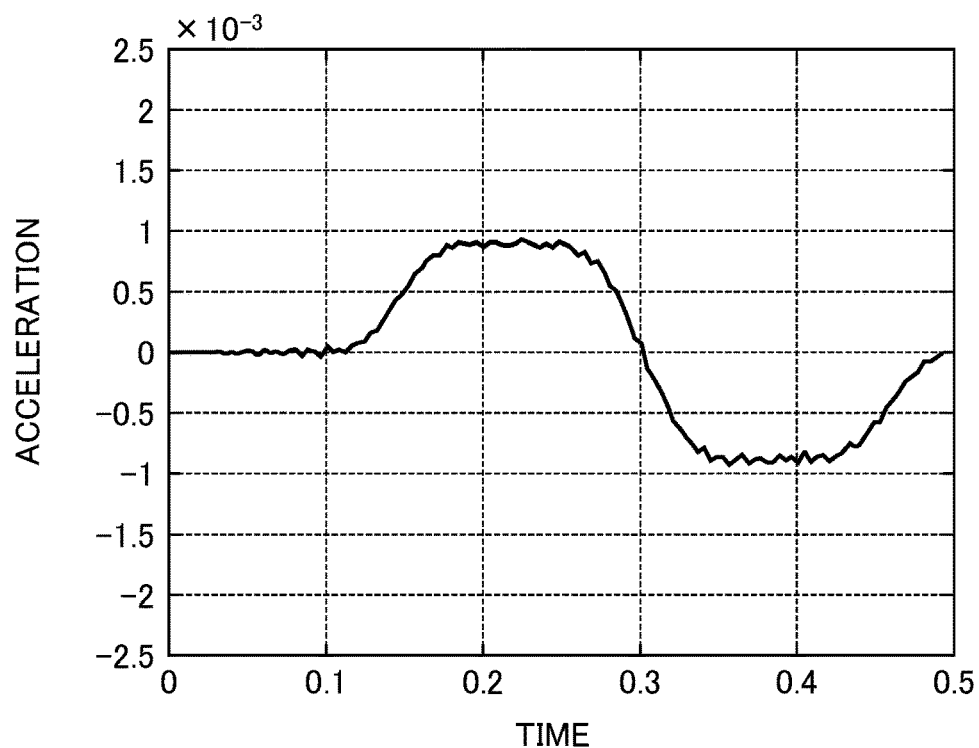
FIG. 1A shows one example of the time series data of command acceleration of the operating velocity at which problematic vibration is generated.
Figure 1B:
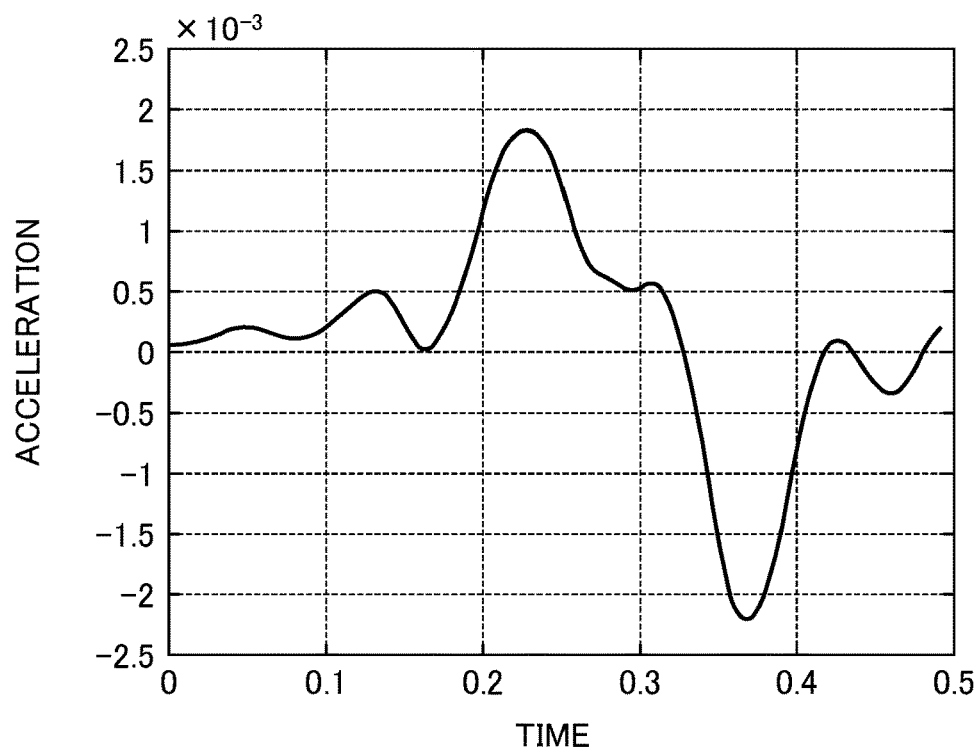
FIG. 1B shows one example of the time series data of acceleration detected by a wireless sensor of the operating velocity at which problematic vibration is generated.

The first embodiment will be described below by referring to the drawings.

First Embodiment

Figure 2:
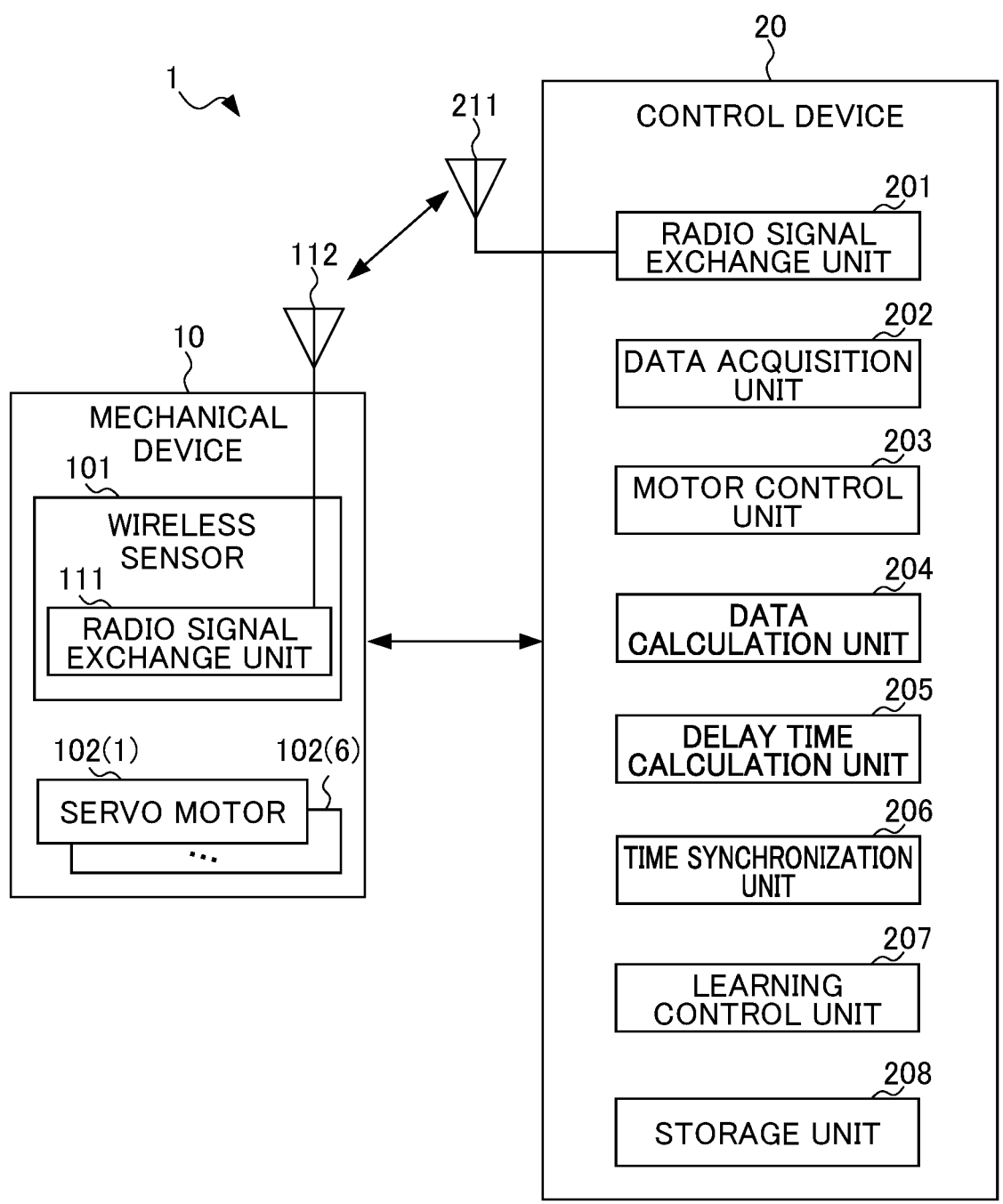
FIG. 2 is a functional block diagram illustrating a functional configuration example of a mechanical system according to a first embodiment.

FIG. 2 is a functional block diagram illustrating a functional configuration example of a mechanical system 1 according to the first embodiment. As shown in FIG. 2, the mechanical system 1 has a mechanical device 10 and a control device 20.

The mechanical device 10 and the control device 20 may be directly connected to each other via a connection interface not shown. It is noted that the mechanical device 10 and the control device 20 may be connected to each other via a network such as LAN (local area network). In this case, each of the mechanical device 10 and the control device 20 may include a communication unit not shown configured to perform mutual communication by such connection.

The mechanical device 10 is, for example, a machine tool or an industrial robot. In the description below, the mechanical device 10 is an industrial robot (hereinafter, also referred to as "robot 10").

Figure 3:
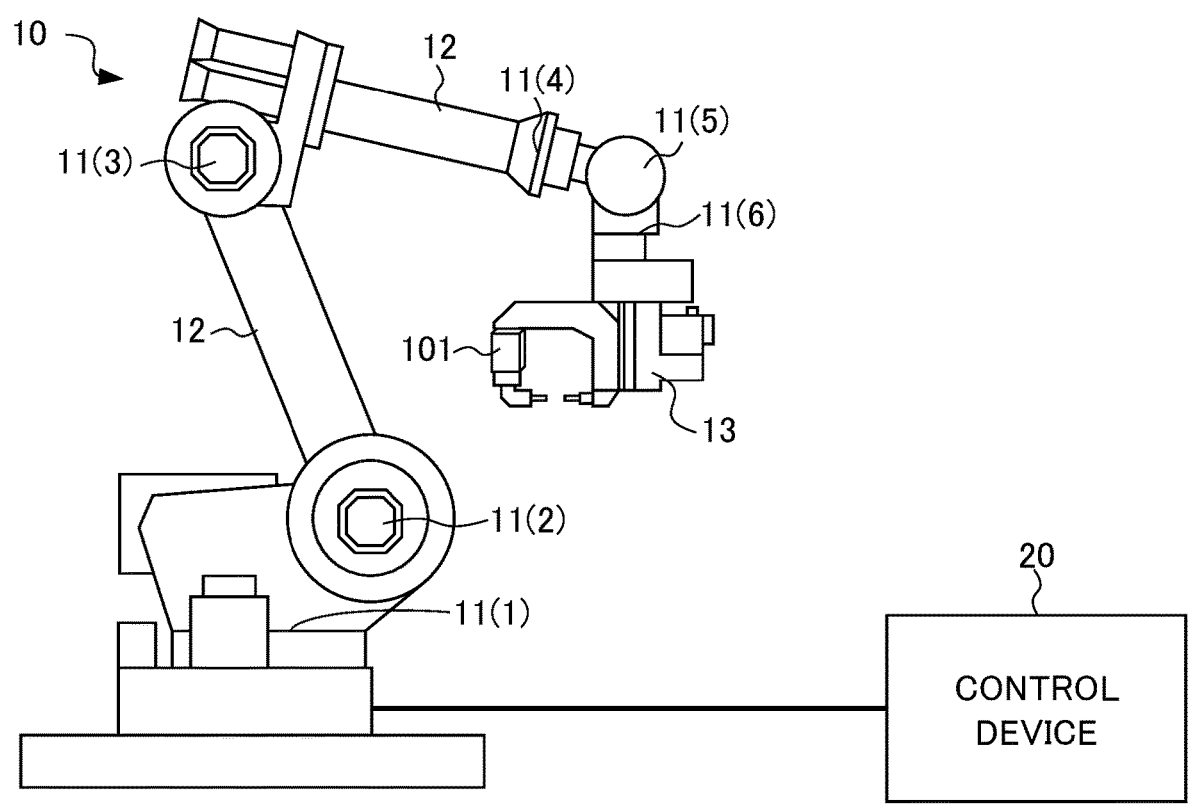
FIG. 3 shows one example of a robot.

FIG. 3 shows one example of the robot 10.

The robot 10 is, which is, for example, a vertical articulated type robot having six axes as shown in FIG. 3, has six joint shafts of a joint shaft 11(1) to a joint shaft 11(6) and an arm part 12 connected by the respective joint shafts 11(1) to 11(6). The robot 10 drives a movable member such as the arm part 12, by driving a servo motor 102(1) to a servo motor 102(6) respectively arranged to the joint shafts 11(1) to 11(6), on the basis of the drive command issued by the control device 20. In an example, an end effector 13 such as a welding gun, a gripping hand, or a laser irradiation device is attached to the tip part of the movable member of the robot 10, for example, the tip part of the joint shaft 11(6). A wireless sensor 101 is disposed to the end effector 13.

It is noted that the robot 10 is a vertical articulated robot having six axes in the description above, or alternatively may be a vertical articulated robot having axes other than six axes, or may be a horizontal articulated robot or a parallel link robot.

Hereinafter, the joint shafts 11(1) to 11(6) may be collectively referred to as "joint shafts 11" in the case where it is not necessary to distinguish the joint shafts 11(1) to 11(6) individually. Moreover, the servo motors 102(1) to 102(6) may be collectively referred to as "servo motors 102" in the case where it is not necessary to distinguish the servo motors 102(1) to 102(6) individually.

Figure 4:
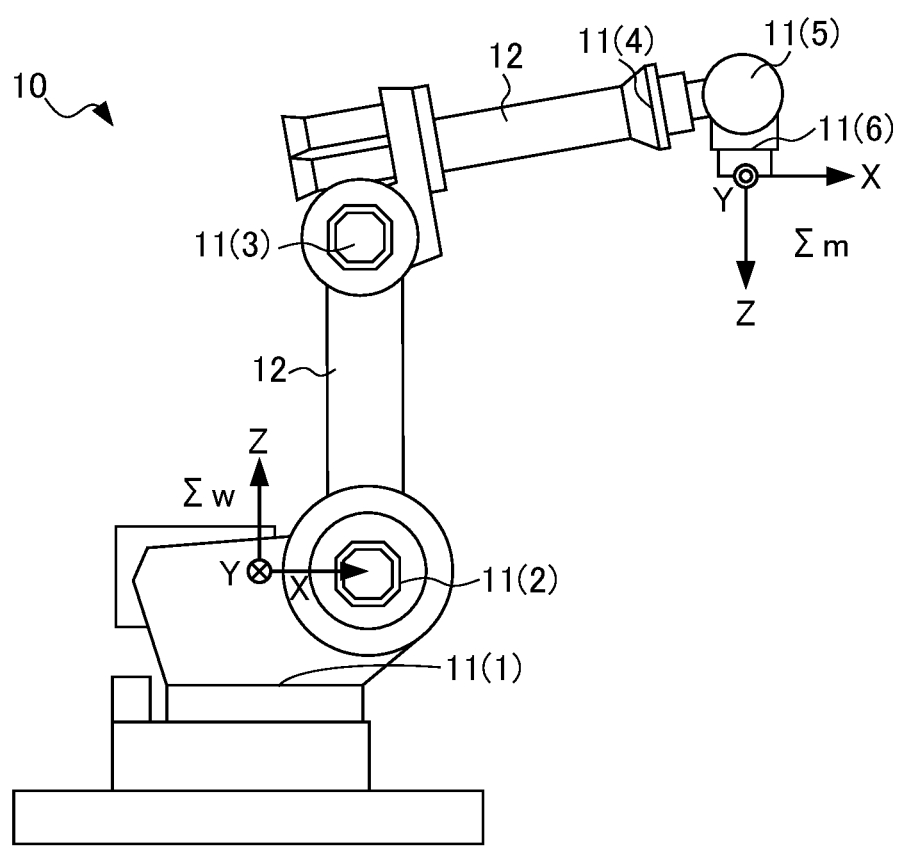
FIG. 4 explains coordinate systems in the robot shown in FIG. 3.

FIG. 4 describes coordinate systems in the robot 10 shown in FIG. 3.

As shown in FIG. 4, the robot 10 has a world frame $\Sigma w$ of a three-dimensional orthogonal coordinate system fixed on a space, and a mechanical interface coordinate system $\Sigma m$ of a three-dimensional orthogonal coordinate system set to the flange of the tip part of the joint shaft 11(6) of the robot 10. In the present embodiment, the world frame $\Sigma w$ and the mechanical interface coordinate system $\Sigma m$ are previously correlated in position by a well-known calibration. This allows the control device 20 described below to control the position of the tip part of the robot 10 which the end effector 13 is attached to, by use of the position defined by the world frame $\Sigma w$.

The wireless sensor 101 is an acceleration sensor configured to detect the acceleration at the tip part of the movable member during when the robot 10 operates, periodically at a predetermined sampling time. The wireless sensor 101 has a clock unit not shown, and acquires, as detected time, the time information output by the clock unit, each time detecting the acceleration. The wireless sensor 101 includes, for example, a radio signal exchange unit 111. The radio signal exchange unit 111 wirelessly transmits the sensor signal including the detected acceleration and time information, to the control device 20 via an antenna 112.

It is noted that a predetermined sampling time may be set as appropriate depending on the operation contents of the robot 10, the environment of the factory where the robot 10 is arranged, or other factors.

The wireless sensor 101 is not limited to such an acceleration sensor, but may be a velocity sensor for detecting the velocity of the tip part of the movable member, or a device for detecting the position of the tip part of the movable member, such as a laser tracker, a camera, or a motion capture device.

The radio signal exchange unit 111 is included in the wireless sensor 101 in the description above, or alternatively may be a device separate from the wireless sensor 101.

<Control Device 20>

The control device 20 (also referred to as a "robot controller") controls the operation of the robot 10, by outputting a drive command to the robot 10 on the basis of a program.

As shown in FIG. 2, the control device 20 according to the present embodiment is configured with a radio signal exchange unit 201, a data acquisition unit 202, a motor control unit 203, a data calculation unit 204, a delay time calculation unit 205, a time synchronization unit 206, a learning control unit 207, and a storage unit 208.

It is noted that the control device 20 includes an arithmetic processing device not shown, such as a CPU (central processing unit), so as to realize the operation of the functional blocks shown in FIG. 2. The control device 20 includes an auxiliary storage device not shown, such as a ROM (read only memory) and an HDD (hard disk drive) storing various types of control programs, and a main storage device not shown, such as a RAM (random access memory) for storing data temporarily required by the arithmetic processing device to execute the programs.

In the control device 20, the arithmetic processing device reads an OS and application software from the auxiliary storage device, and delivers the read OS and application software to the main storage device, thereby performing arithmetic processing on the basis of the OS and application software. The control device 20 controls each set of hardware on the basis of the calculation result. As a result, the processing by the functional blocks shown in FIG. 2 is realized. That is, the control device 20 is able to be realized by collaborative operation of hardware and software.

The radio signal exchange unit 201 receives the sensor signal including the acceleration detected at the tip part of the robot 10 and time information, via an antenna 211. The radio signal exchange unit 201 outputs the received sensor signal to the data acquisition unit 202.

The data acquisition unit 202 acquires, from the sensor signal received via the radio signal exchange unit 201, the acceleration detected by the wireless sensor 101 at the tip part of the movable member of the robot 10, and the detected time information. The data acquisition unit 202 stores the acquired acceleration and the detected time as time series data of the detected acceleration in the storage unit 208 to be described below.

The motor control unit 203, for example, outputs a drive command to the servo motors 102 respectively arranged to the joint shafts 11 of the robot 10, on the basis of a program.

More specifically, the motor control unit 203 performs feedback control so as to match rotation of the servo motors 102 with the values in the drive command, on the basis of the signals transmitted by position detectors not shown, such as rotary encoders, respectively included in the servo motors 102.

It is noted that, in the case where the control device 20 performs time synchronization processing, the motor control unit 203 drives the servo motor 102(6) on the basis of a simple operation program for predetermined basic operation, for example, rotational operation by one axis of the joint shaft 11(6) arranged to the tip part of the movable member. The motor control unit 203 may drive the robot 10, on the basis of a program for operation by any one axis of the joint shafts 11(1) to 11(5) serving as basic operation, in place of the joint shaft 11(6). Alternatively, the basic operation may be of operation by a smaller number than six, such as two or three, of axes, out of six joint shafts 11.

The data calculation unit 204, for example, calculates command acceleration at the tip part of the movable member where the wireless sensor 101 is attached, on the basis of the drive command issued by the motor control unit 203 to the respective servo motors 102.

More specifically, the data calculation unit 204 calculates the time series data of the command position of the tip part of the movable member, on the basis of the values of the drive command for the respective servo motors 102. The data calculation unit 204 calculates the time series data of command acceleration at the tip part of the movable member, by performing second order derivative to the calculated time series data of the command position by time. The data calculation unit 204 stores the calculated time series data of command acceleration in the storage unit 208.

It is noted that, in the case where the control device 20 performs the time synchronization processing, the motor control unit 203 drives, for example, the servo motor 102(6) on the basis of the program for predetermined basic operation, as described above, to perform rotational operation by one axis of the joint shaft 11(6).

Figure 5A:
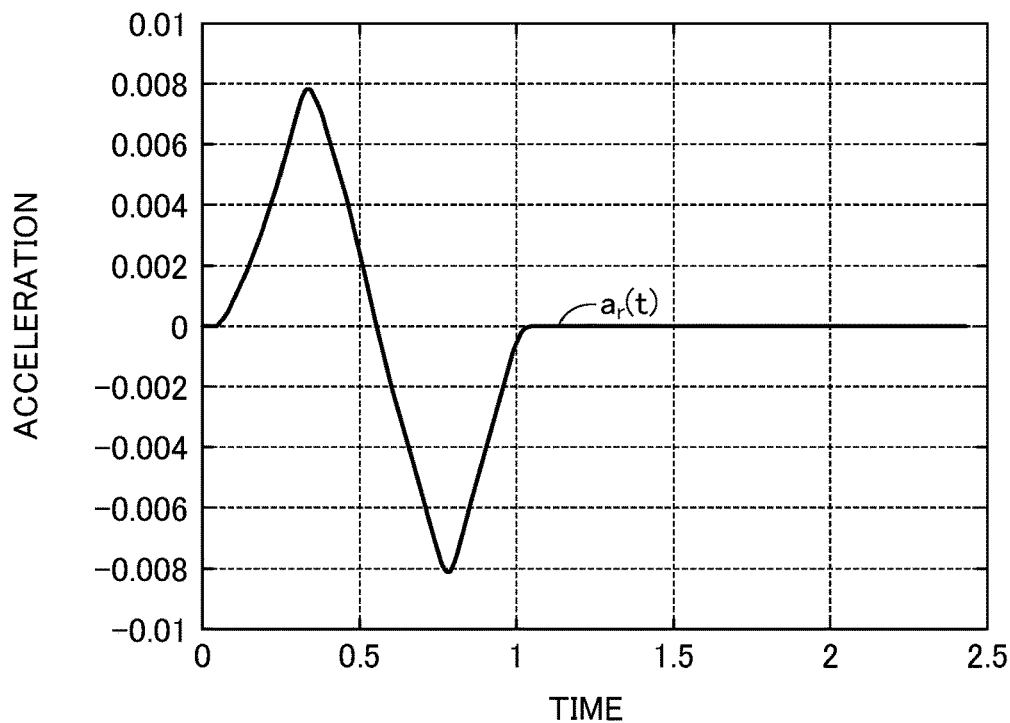
FIG. 5A shows one example of the time series data of command acceleration calculated by a data calculation unit shown in FIG. 2 in basic operation.
Figure 5B:
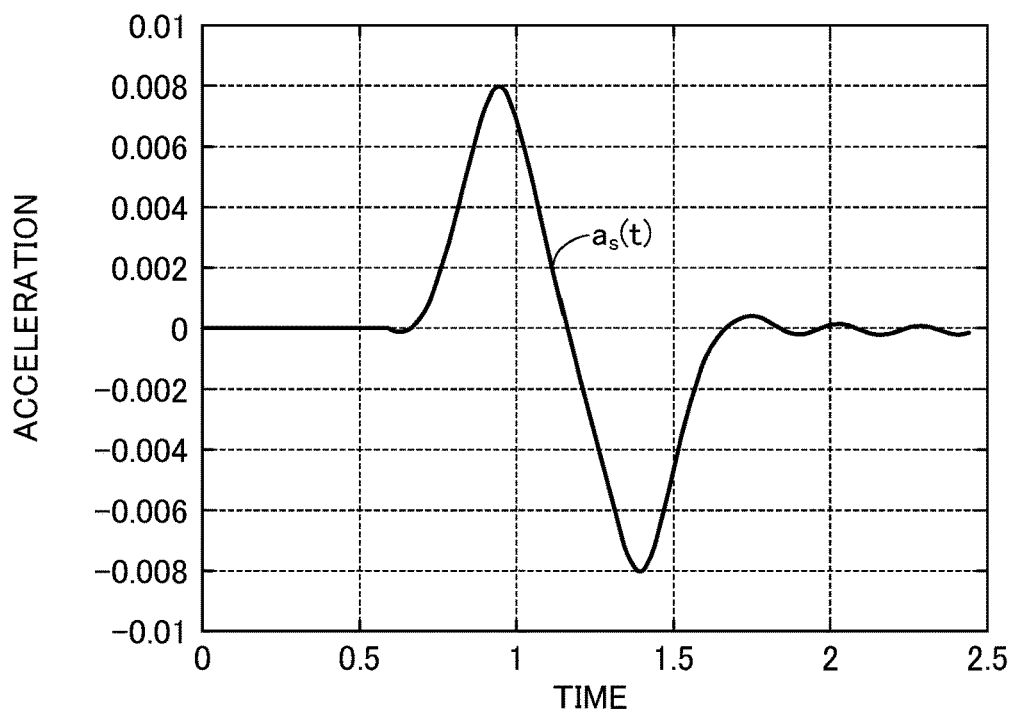
FIG. 5B shows one example of the time series data of acceleration detected by the wireless sensor shown in FIG. 2 in the basic operation.

FIG. 5A shows one example of a time series data $a_r(t)$ of command acceleration calculated by the data calculation unit 204 shown in FIG. 2 in the basic operation. FIG. 5B shows one example of a time series data $a_s(t)$ of acceleration detected by the wireless sensor 101 shown in FIG. 2 in the basic operation.

In this case, simple operation is commanded in the drive command issued by the motor control unit 203, and thus, as shown in FIG. 5A and FIG. 5B, the time series data of command acceleration calculated by the data calculation unit 204 and the time series data of acceleration detected by the wireless sensor 101 indicate the same or similar waveforms to each other, regardless of the magnitudes of the accelerations. This allows the control device 20 according to the present embodiment to synchronize the time of the control device 20 and the time of the wireless sensor 101.

In the case where the robot 10 is made to perform predetermined basic operation, the delay time calculation unit 205 calculates a degree of correlation between the detected time series data $a_s(t)$ of acceleration and the calculated time series data $a_r(t)$ of command acceleration. The delay time calculation unit 205 calculates a delay time of the time series data $a_s(t)$ of acceleration to the time series data $a_r(t)$ of command acceleration, on the basis of the calculated degree of correlation.

Figure 6:
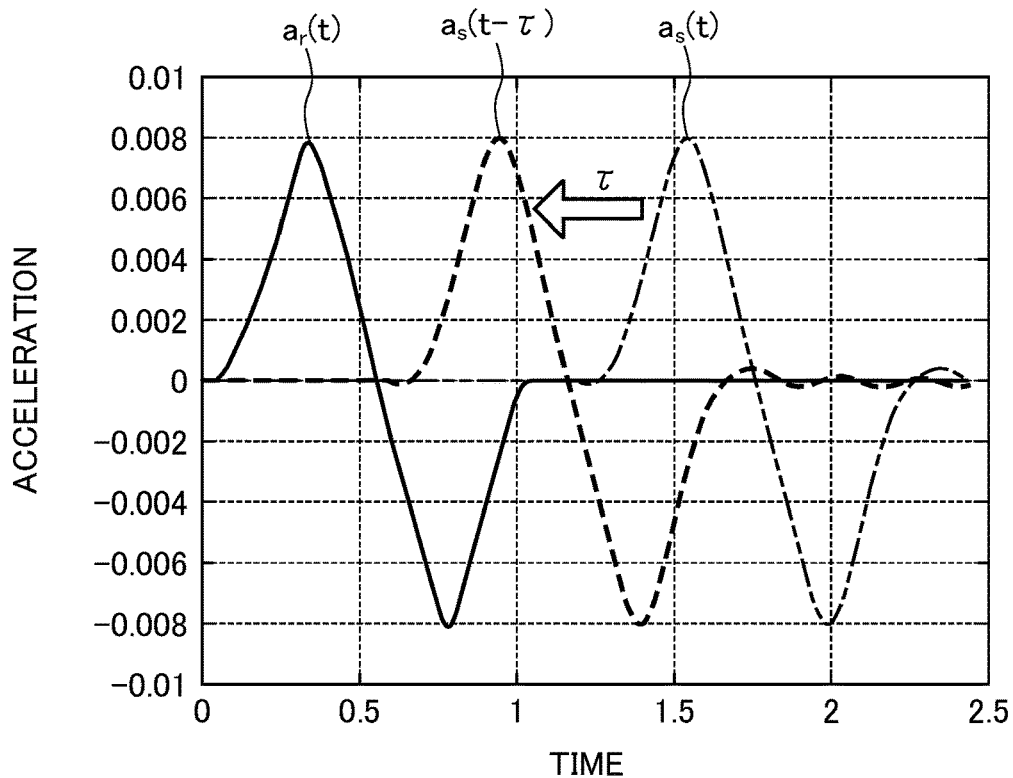
FIG. 6 shows one example of correlation processing performed by a delay time calculation unit shown in FIG. 2.

FIG. 6 shows one example of the correlation processing executed by the delay time calculation unit 205 shown in FIG. 2.

Figure 7:
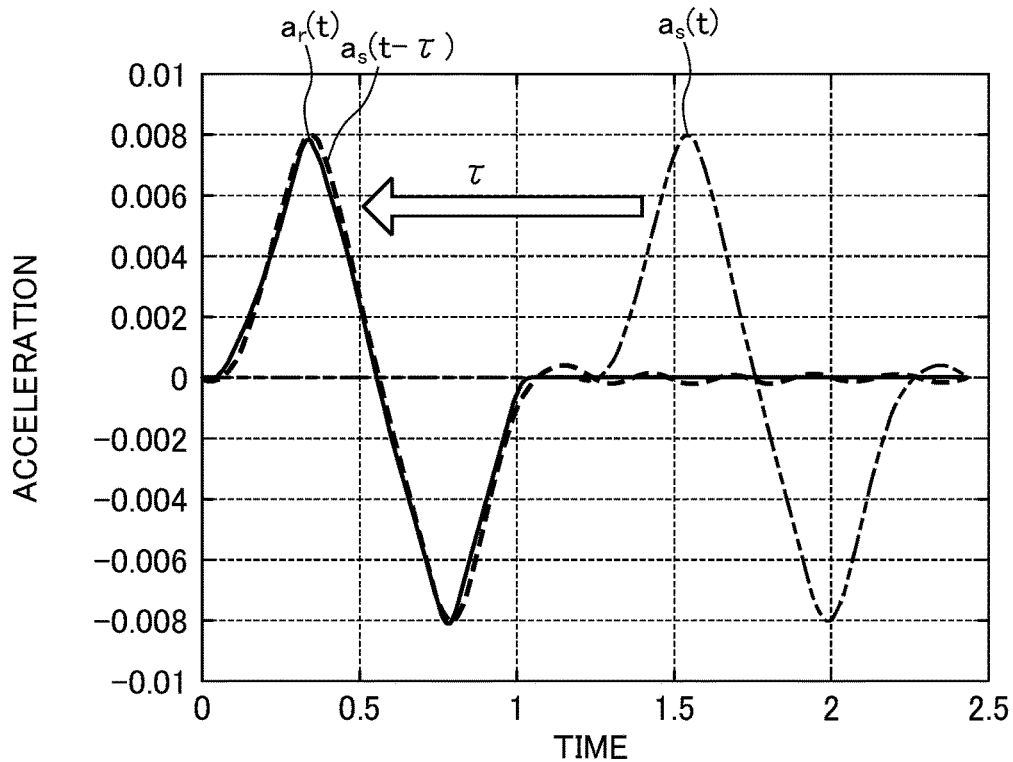
FIG. 7 shows one example of the relation between the time series data of command acceleration and the detected time series data of acceleration at the time when a mutual correlation coefficient is the maximum value.

FIG. 7 shows one example of the relation between the time series data $a_r(t)$ of command acceleration and the detected time series data $a_s(t)$ of acceleration at the time when a mutual correlation coefficient $r(\tau)$ is the maximum value.

It is noted that, in each of FIG. 6 and FIG. 7, the time series data $a_r(t)$ of command acceleration is indicated by a solid line. The time series data $a_s(t)$ of acceleration detected by the wireless sensor 101 is indicated by a two-dot chain line. A time series data $a_s(t-\tau)$ of acceleration detected and shifted by a delay time $\tau$ is indicated by a dashed line.

More specifically, the delay time calculation unit 205 calculates the mutual correlation coefficient $r(\tau)$, by shifting, by $\tau$ seconds in the direction indicated by the arrow as shown in FIG. 6, the time series data $a_s(t)$ of acceleration detected by the wireless sensor 101 to the time series data $a_r(t)$ of command acceleration calculated by the data calculation unit 204. The delay time calculation unit 205 calculates the mutual correlation coefficients $r(\tau)$ with respect to various values of a time $\tau$, and calculates the value $\tau$ deriving the maximum mutual correlation coefficient $r(\tau)$, as shown in FIG. 7. In other words, the time of the clock unit not shown included in the wireless sensor 101 is deviated by the time $\tau$ deriving the maximum mutual correlation coefficient $r(\tau)$, from the time of the clock unit not shown included in the control device 20.

The time synchronization unit 206 may synchronize the time of the wireless sensor 101 and the time of the control device 20, on the basis of the delay time $\tau$ calculated by the delay time calculation unit 205.

More specifically, the time synchronization unit 206 compensates the time information output by the clock unit not shown of the control device 20 by use of the delay time $\tau$. With the compensation, the time synchronization unit 206 is able to synchronize the time information output by the clock unit not shown of the wireless sensor 101 and the time information output by the clock unit not shown of the control device 20.

The learning control unit 207, for example, executes an actual machining program to be subjected to learning control after the time of the wireless sensor 101 and the time of the control device 20 are synchronized, to acquire the time series data of acceleration detected by the wireless sensor 101 during when the robot 10 operates, and the position command included in the drive command. The learning control unit 207 stores the acquired time series data of acceleration and the acquired position command in the storage unit 208.

After the program to be subjected to learning control is executed once, the learning control unit 207 calculates an amount of vibration for each control period during when the robot 10 operates, and the vibration compensation amount for canceling the calculated amount of vibration, and stores them in the storage unit 208. The learning control unit 207 applies the vibration compensation amount stored in the storage unit 208 next time when the same program is executed. The repetition of such application multiple times enables to reduce the vibration at the tip part of the movable member of the robot 10.

It is noted that the learning control unit 207 is able to execute the learning control by, for example, a method similar to the method disclosed in Patent Document 1, and thus the detailed description of the method is omitted.

The storage unit 208, which is a RAM or the like, stores a program, the time series data of acceleration detected by the wireless sensor 101, the time series data of command acceleration calculated by the data calculation unit 204, and the like.

<Time Synchronization Processing of Control Device 20>

The operation in the time synchronization processing by the control device 20 according to the present embodiment is described next.

FIG. 8 is a flowchart for describing the time synchronization processing of the control device 20.

In step S11, the motor control unit 203 outputs a drive command on the basis of a program for predetermined basic operation, to make the robot 10 operate.

In step S12, the data acquisition unit 202 acquires, from the sensor signal received via the radio signal exchange unit 201, the time series data $a_s(t)$ of acceleration at the tip part of the movable member detected by the wireless sensor 101 in the basic operation of the robot 10.

In step S13, the data calculation unit 204 calculates the time series data $a_r(t)$ of command acceleration at the tip part of the movable member of the robot 10, on the basis of the drive command of the basic operation.

In step S14, the delay time calculation unit 205 calculates a mutual correlation coefficient $r(\tau)$ between the time series data $a_s(t)$ of acceleration acquired in step S11 and the time series data $a_r(t)$ of command acceleration calculated in step S12, and then calculates a delay time $\tau$ of the detected time series data $a_s(t)$ of acceleration to the time series data $a_r(t)$ of command acceleration.

In step S15, the time synchronization unit 206 synchronizes the time of the wireless sensor 101 and the time of the control device 20, on the basis of the delay time $\tau$ calculated in step S13.

As described above, the control device 20 according to the first embodiment makes the robot 10 perform predetermined basic operation, and acquires the time series data $a_s(t)$ of acceleration detected by the wireless sensor 101 at the tip part of the movable member of the robot 10, and the time series data $a_r(t)$ of command acceleration. The control device 20 calculates the delay time $\tau$ of the detected time series data $a_s(t)$ of acceleration to the time series data $a_r(t)$ of command acceleration, on the basis of the degree of correlation between the detected time series data $a_s(t)$ of acceleration and the time series data $a_r(t)$ of command acceleration.

This allows the control device 20 to easily synchronize the time of the wireless sensor 101 and the time of the control device 20, on the basis of the calculated delay time $\tau$, resulting in enabling to suppress the vibration at the tip part of the robot 10 by learning control.

Even in the case of periodically synchronizing the time of the wireless sensor 101 and the time of the control device 20, the control device 20 makes the robot 10 perform the basic operation just once with one joint shaft 11, and thus time synchronization requires less time and labor.

Second Embodiment

The second embodiment is different from the first embodiment, in that a control device according to the second embodiment makes a robot perform the operation indicated in the program to be executed by the control device at a velocity equal to or less than a predetermined value, instead of making the robot perform predetermined basic operation at the velocity indicated in the program.

The second embodiment is described below.

A mechanical system according to the second embodiment of the present disclosure includes a configuration similar to the configuration of the mechanical system 1 according to the first embodiment shown in FIG. 2.

A mechanical device (robot) and a control device according to the second embodiment also respectively include configurations similar to the configurations of the control device (robot) 10 and the control device 20 according to the first embodiment shown in FIG. 2 and FIG. 3.

However, the second embodiment is different from the first embodiment, in that, in time synchronization processing, the motor control unit 203 of the control device 20 according to the second embodiment makes the robot 10 perform the operation indicated in the program to be executed by the control device 20 at a velocity equal to or less than a predetermined value, instead of the velocity indicated in the program.

In an example, in the case where, in the time synchronization processing, the robot 10 hardly performs the basic operation due to the arrangement of a jig or the like in the vicinity of the robot 10, due to the attachment of the large-sized end effector 13 to the robot 10, or other factors, the motor control unit 203 may make the robot 10 perform the operation based on the program for actual machining to be subjected to learning control.

More specifically, the motor control unit 203 may drive the servo motors 102, so that the robot 10 performs the operation indicated in the program for actual machining at a velocity equal to or less than a predetermined value, instead of the velocity indicated in the program.

In this case, the operating velocity of the robot 10 in the time synchronization processing may be set to the velocity at which at least the time series data $a_s(t)$ of acceleration detected by the wireless sensor 101 and the time series data $a_r(t)$ of command acceleration calculated by the data calculation unit 204 indicate the same or similar waveforms to each other. In an example, the motor control unit 203 may make the robot 10 perform the operation indicated in the actual machining program to be subjected to learning control, in advance at various velocities. The control device 20 may check, at each velocity, the waveform of the time series data $a_s(t)$ of acceleration detected by the wireless sensor 101 and the waveform of the time series data $a_r(t)$ of command acceleration calculated by the data calculation unit 204, and then may set a velocity equal to or less than a predetermined value, at which the same or similar wave forms are indicated.

It is noted that a predetermined value herein may be set as appropriate, depending on the operation contents of the robot 10, the environment of the factory where the robot 10 is arranged, or other factors.

In the case where the robot 10 is made to perform the operation indicated in the program for actual machining at a velocity equal to or less than a predetermined value, instead of the velocity indicated in the program, the delay time calculation unit 205 may calculate the delay time $\tau$ of the time series data $a_s(t)$ of acceleration to the time series data $a_r(t)$ of command acceleration, on the basis of the degree of correlation between the detected time series data $a_s(t)$ of acceleration and the calculated time series data $a_r(t)$ of command acceleration.

This allows the control device 20 to synchronize the time of the wireless sensor 101 and the time of the control device 20 on the basis of the program for actual machining, thereby enabling to perform learning control more precisely.

As described above, the control device 20 according to the second embodiment makes the robot 10 perform the operation indicated in the program for actual machining, at a velocity equal to or less than a predetermined value, instead of the velocity indicated in the program. The control device 20 acquires the time series data $a_s(t)$ of acceleration detected by the wireless sensor 101 at the tip part of the movable member of the robot 10, and the time series data $a_r(t)$ of command acceleration. The control device 20 calculates the delay time $\tau$ of the detected time series data $a_s(t)$ of acceleration to the time series data $a_r(t)$ of command acceleration, on the basis of the degree of correlation between the detected time series data $a_s(t)$ of acceleration and the time series data $a_r(t)$ of command acceleration.

This allows the control device 20 to easily synchronize the time of the wireless sensor 101 and the time of the control device 20 on the basis of the calculated delay time $\tau$, resulting in enabling to suppress the vibration at the tip part of the robot 10 by learning control.

The synchronization of the time of the wireless sensor 101 and the time of the control device 20 based on the program for actual machining allows the control device 20 to perform more precise learning control.

The first embodiment and the second embodiment have been described so far. The control device 20 is not limited to the embodiments described above. Modifications and improvements are available within the range where the object is achieved.

In each of the first embodiment and the second embodiment described above, the wireless sensor 101 is an acceleration sensor. Alternatively, the wireless sensor 101 may be an inertial sensor, or may be a velocity sensor for detecting the velocity of the tip part of the movable member, or a position sensor for detecting the position of the tip part of the movable member, such as a laser tracker, a camera, or a motion capture device.

In the case where the wireless sensor 101 is a velocity sensor, the data acquisition unit 202 acquires the velocity detected at the tip part of the movable member of the robot 10 from the received sensor signal, and the detection time. The data acquisition unit 202 performs first order derivative to the acquired time series data of velocity by time, thereby enabling to acquire the time series data of acceleration.

While in the case where the wireless sensor 101 is a position sensor, the data acquisition unit 202 acquires the position detected at the tip part of the movable member of the robot 10 from the received sensor signal, and the detection time. The data acquisition unit 202 then performs second order derivative to the acquired time series data of position by time, thereby enabling to acquire the time series data of acceleration.

In each of the first embodiment and the second embodiment described above, the wireless sensor 101 is arranged to the tip part of the movable member of the robot 10. Alternatively, the wireless sensor 101 may be arranged to another part than the tip part of the movable member of the robot 10. The arrangement allows to reduce the influence of a position where the wireless sensor 101 is arranged for each of the end effectors 13.

It is noted that the functions included in the control device 20 according to the first embodiment and the second embodiment are able to be realized respectively by hardware, software herein or the combination thereof. Being realized by software herein means that the functions are respectively realized when a computer reads and executes a program.

Programs are able to be stored by use of various types of non-transitory computer readable media, to be supplied to a computer. The non-transitory computer-readable media include various types of tangible storage media. Examples of the non-transitory computer-readable media include magnetic recording medium (for example, flexible disk, magnetic tape, hard disk drive), magneto-optical recording medium (for example, magneto-optical disk), CD-ROM (read only memory), CD-R, CD-R/W, and semiconductor memory (for example, mask ROM, PROM (programmable ROM), EPROM (erasable PROM), flash ROM, RAM). Such programs may be supplied to a computer by various types of transitory computer readable media. Examples of the transitory computer readable media include electrical signal, optical signal, and electromagnetic wave. Such a transitory computer readable medium is capable of supplying a program via a wired communication channel such as wires and optical fibers, or via a wireless communication channel.

It is noted that the steps of describing the program to be recorded in a recording medium include not only the processing to be executed in a time series manner according to the order of the steps, but also the processing to be executed in parallel or individually, not necessarily to be executed in a time series manner.

In summary, the control device, the mechanical system and the time synchronization method according to the present disclosure are able to be realized in various types of embodiments having the following configurations.

(1) A control device 20 according to the present disclosure is configured to control a mechanical device 10 having a movable member to be driven by a motor (servo motor 102). The control device 20 includes a radio signal exchange unit 201 configured to receive a sensor signal indicating a position, a velocity or an acceleration of a tip part of the movable member of the mechanical device 10 periodically detected by a sensor part (wireless sensor 101) arranged to the tip part, a data acquisition unit 202 configured to acquire first time-series data $a_s(t)$ of acceleration at the tip part of the movable member on the basis of the position, the velocity or the acceleration in the received sensor signal, a data calculation unit 204 configured to calculate second time-series data $a_r(t)$ of acceleration at the tip part of the movable member corresponding to the first time-series data $a_s(t)$, on the basis of a drive command to the motor, a delay time calculation unit 205 configured to calculate, when the mechanical device 10 is made to perform predetermined basic operation, a delay time $\tau$ of the first time-series data $a_s(t)$ acquired by the data acquisition unit 202 to the second time-series data $a_r(t)$ calculated by the data calculation unit 204, on the basis of a degree of correlation between the first time-series data $a_s(t)$ and the second time-series data $a_r(t)$, and a time synchronization unit 206 configured to synchronize time of the sensor part and time of the control device 20, on the basis of the delay time $\tau$ calculated by the delay time calculation unit 205.

The control device 20 is capable of easily synchronizing the time of the wireless sensor 101 and the time of the control device 20, resulting in enabling to suppress the vibration at the tip part of the mechanical device 10 by learning control.

(2) The basic operation described above may be to drive at least one of a plurality of the motors (servo motors 102) included in the mechanical device 10.

Even in the case where the time of the wireless sensor 101 and the time of the control device 20 are synchronized periodically, such time synchronization with the basic operation requires less time and labor.

(3) A control device 20 according to the present disclosure is configured to control a mechanical device 10 having a movable member to be driven by a motor (servo motor 102). The control device 20 includes a radio signal exchange unit 201 configured to receive a sensor signal indicating a position, a velocity or an acceleration of a tip part of the movable member of the mechanical device 10 periodically detected by a sensor part (wireless sensor 101) arranged to the tip part, a data acquisition unit 202 configured to acquire first time-series data $a_s(t)$ of acceleration at the tip part of the movable member on the basis of the position, the velocity or the acceleration in the received sensor signal, a data calculation unit 204 configured to calculate second time-series data $a_r(t)$ of acceleration at the tip part of the movable member corresponding to the first time-series data $a_s(t)$, on the basis of a drive command to the motor, a delay time calculation unit 205 configured to calculate, when the mechanical device 10 is made to perform operation indicated in a program to be executed by the control device 20 at a velocity equal to or less than a predetermined value instead of a velocity indicated in the program, a delay time τ of the first time-series data $a_s(t)$ acquired by the data acquisition unit 202 to the second time-series data $a_r(t)$ calculated by the data calculation unit 204, on the basis of a degree of correlation between the first time-series data $a_s(t)$ and the second time-series data $a_r(t)$, and a time synchronization unit 206 configured to synchronize time of the sensor part and time of the control device 20, on the basis of the delay time τ calculated by the delay time calculation unit 205.

The control device 20 is capable of easily synchronizing the time of the wireless sensor 101 and the time of the control device 20, resulting in enabling to suppress the vibration at the tip part of the mechanical device 10 by learning control.

(4) The mechanical device 10 described above may be a robot, and the control device 20 described above may be a robot control device.

The configurations allow to perform precise learning control with respect to the vibration at the tip part of the movable member of the robot (mechanical device) 10.

(5) A control system 1 according to the present disclosure includes a mechanical device having a movable member to be driven by a motor (servo motor 102), and the control device (20) according to any one of (1) to (4).

The mechanical system 1 described above is capable of producing effects similar to the effects of any one of (1) to (4).

(6) A time synchronization method according to the present disclosure is executed to perform, in a mechanical system 1 including a mechanical device 10 having a movable member to be driven by a motor (servo motor 102) and a control device 20 for controlling the mechanical device 10, time synchronization between a sensor part (wireless sensor 101) arranged to a tip part of the movable member of the mechanical device 10 and the control device 20. The time synchronization method includes a radio signal exchanging step of receiving a sensor signal indicating a position, a velocity or an acceleration of the tip part periodically detected by the sensor part, a data acquiring step of acquiring first time-series data $a_s(t)$ of acceleration at the tip part of the movable member, on the basis of the position, the velocity or the acceleration in the received sensor signal, a data calculating step of calculating second time-series data $a_r(t)$ of acceleration at the tip part of the movable member corresponding to the first time-series data $a_s(t)$, on the basis of a drive command to the motor, a delay time calculating step of calculating, when the mechanical device 10 is made to perform predetermined basic operation, a delay time τ of the first time-series data $a_s(t)$ acquired in the data acquiring step to the second time-series data $a_r(t)$ calculated in the data calculating step, on the basis of a degree of correlation between the first time-series data $a_s(t)$ and the second time-series data $a_r(t)$, and a time synchronizing step of synchronizing time of the sensor part and time of the control device 20, on the basis of the delay time τ calculated in the delay time calculating step.

The time synchronization method is capable of producing effects similar to the effects of (1).

(7) A time synchronization method according to the present disclosure is executed to perform, in a mechanical system 1 including a mechanical device 10 having a movable member to be driven by a motor (servo motor 102) and a control device 20 for controlling the mechanical device 10, time synchronization between a sensor part (wireless sensor 101) arranged to a tip part of the movable member of the mechanical device 10 and the control device 20. The time synchronization method includes a radio signal exchanging step of receiving a sensor signal indicating a position, a velocity or an acceleration of the tip part periodically detected by the sensor part, a data acquiring step of acquiring first time-series data $a_s(t)$ of acceleration at the tip part of the movable member, on the basis of the position, the velocity or the acceleration in the received sensor signal, a data calculating step of calculating second time-series data $a_r(t)$ of acceleration at the tip part of the movable member corresponding to the first time-series data $a_s(t)$, on the basis of a drive command to the motor, a delay time calculating step of calculating, when the mechanical device 10 is made to perform operation indicated in a program to be executed by the control device 20 at a velocity equal to or less than a predetermined value instead of a velocity indicated in the program, a delay time τ of the first time-series data $a_s(t)$ acquired in the data acquiring step to the second time-series data $a_r(t)$ calculated in the data calculating step, on the basis of a degree of correlation between the first time-series data $a_s(t)$ and the second time-series data $a_r(t)$, and a time synchronizing step of synchronizing time of the sensor part and time of the control device 20, on the basis of the delay time τ calculated in the delay time calculating step.

The time synchronization method is capable of producing effects similar to the effects of (3).

EXPLANATION OF REFERENCE NUMERALS

1 MECHANICAL SYSTEM
10 MECHANICAL DEVICE (ROBOT)
20 CONTROL DEVICE
101 WIRELESS SENSOR
202 DATA ACQUISITION UNIT
203 MOTOR CONTROL UNIT
204 DATA CALCULATION UNIT
205 DELAY TIME CALCULATION UNIT
206 TIME SYNCHRONIZATION UNIT
207 LEARNING CONTROL UNIT

What is claimed is:
1. A system comprising:
a mechanical device having a plurality of motors and a movable member with a tip part; and
a control device configured to control the mechanical device, the control device comprising a processor configured to:
receive a sensor signal indicating a position, a velocity or an acceleration of the tip part of the movable member of the mechanical device periodically detected by a sensor part arranged to the tip part;
acquire first time-series data of acceleration at the tip part of the movable member, on the basis of the position, the velocity or the acceleration in the received sensor signal;
calculate second time-series data of acceleration at the tip part of the movable member corresponding to the first time-series data, on the basis of a drive command to one of the plurality of motors;
calculate, when one motor, which is arranged closest to the tip part of the movable member to which the sensor part is arranged, of the plurality of motors of the mechanical device is driven to rotate the tip part of the movable member, a delay time of the acquired first time-series data with respect to the calculated second time-series data, on the basis of a degree of correlation between the first time-series data and the second time-series data; and synchronize time of the sensor part and time of the control device, on the basis of the calculated delay time.

2. A control device configured to control a mechanical device having a movable member to be driven by a motor, the control device comprising:
   a radio signal exchange unit configured to receive a sensor signal indicating a position, a velocity or an acceleration of a tip part of the movable member of the mechanical device periodically detected by a sensor part arranged to the tip part;
   a data acquisition unit configured to acquire first time-series data of acceleration at the tip part of the movable member, on the basis of the position, the velocity or the acceleration in the received sensor signal;
   a data calculation unit configured to calculate second time-series data of acceleration at the tip part of the movable member corresponding to the first time-series data, on the basis of a drive command to the motor;
   a delay time calculation unit configured to calculate, when the mechanical device is made to perform an operation indicated in a program to be executed by the control device at a velocity equal to or less than a predetermined value instead of a velocity indicated in the program, a delay time of the first time-series data acquired by the data acquisition unit with respect to the second time-series data calculated by the data calculation unit, on the basis of a degree of correlation between the first time-series data and the second time-series data; and
   a time synchronization unit configured to synchronize time of the sensor part and time of the control device, on the basis of the delay time calculated by the delay time calculation unit.

3. The system according to claim 1, wherein the mechanical device is a robot, and the control device is a robot control device.

4. The control device according to claim 2, wherein the mechanical device is a robot, and the control device is a robot control device.

5. A control system comprising:
   a mechanical device having a movable member to be driven by a motor; and
   the control device according to claim 2.

6. A time synchronization method for performing, in a mechanical system including a mechanical device having a movable member to be driven by a motor and a control device for controlling the mechanical device, time synchronization between a sensor part arranged to a tip part of the movable member of the mechanical device and the control device, the time synchronization method comprising:
   a radio signal exchanging step of receiving a sensor signal indicating a position, a velocity or an acceleration of the tip part periodically detected by the sensor part;
   a data acquiring step of acquiring first time-series data of acceleration at the tip part of the movable member, on the basis of the position, the velocity or the acceleration in the received sensor signal;
   a data calculating step of calculating second time-series data of acceleration at the tip part of the movable member corresponding to the first time-series data, on the basis of a drive command to the motor;
   a delay time calculating step of calculating, when one motor, which is arranged closest to the tip part of the movable member to which the sensor part is arranged, of a plurality of motors including the motor of the mechanical device is driven to rotate the tip part of the movable member, a delay time of the first time-series data acquired in the data acquiring step with respect to the second time-series data calculated in the data calculating step, on the basis of a degree of correlation between the first time-series data and the second time-series data; and
   a time synchronizing step of synchronizing time of the sensor part and time of the control device, on the basis of the delay time calculated in the delay time calculating step.

7. A time synchronization method for performing, in a mechanical system including a mechanical device having a movable member to be driven by a motor and a control device for controlling the mechanical device, time synchronization between a sensor part arranged to a tip part of the movable member of the mechanical device and the control device, the time synchronization method comprising:
   a radio signal exchanging step of receiving a sensor signal indicating a position, a velocity or an acceleration of the tip part periodically detected by the sensor part;
   a data acquiring step of acquiring first time-series data of acceleration at the tip part of the movable member, on the basis of the position, the velocity or the acceleration in the received sensor signal;
   a data calculating step of calculating second time-series data of acceleration at the tip part of the movable member corresponding to the first time-series data, on the basis of a drive command to the motor;
   a delay time calculating step of calculating, when the mechanical device is made to perform an operation indicated in a program to be executed by the control device at a velocity equal to or less than a predetermined value instead of a velocity indicated in the program, a delay time of the first time-series data acquired in the data acquiring step with respect to the second time-series data calculated in the data calculating step, on the basis of a degree of correlation between the first time-series data and the second time-series data; and
   a time synchronizing step of synchronizing time of the sensor part and time of the control device, on the basis of the delay time calculated in the delay time calculating step.

* * * * *